US009667579B2

(12) United States Patent
Liu

(10) Patent No.: US 9,667,579 B2
(45) Date of Patent: May 30, 2017

(54) METHOD FOR IMPLEMENTING END-TO-END MESSAGE PUSH USING A GEOGRAPHICAL SIGNAL FEATURE CLUSTER

(71) Applicant: HyXen Technology Co., Ltd., New Taipei (TW)

(72) Inventor: Bo-Chih Liu, New Taipei (TW)

(73) Assignee: HyXen Technology Co., Ltd., New Taipei (TW)

( * ) Notice: Subject to any disclaimer, the term of this patent is extended or adjusted under 35 U.S.C. 154(b) by 244 days.

(21) Appl. No.: 14/404,227

(22) PCT Filed: Oct. 31, 2012

(86) PCT No.: PCT/CN2012/083808
§ 371 (c)(1),
(2) Date: Nov. 26, 2014

(87) PCT Pub. No.: WO2013/177897
PCT Pub. Date: Dec. 5, 2013

(65) Prior Publication Data
US 2015/0142868 A1    May 21, 2015

(30) Foreign Application Priority Data
May 26, 2012    (CN) .......................... 2012 1 0178842

(51) Int. Cl.
*H04L 12/58*    (2006.01)
*H04L 12/18*    (2006.01)
(Continued)

(52) U.S. Cl.
CPC .......... *H04L 51/20* (2013.01); *H04L 12/1845* (2013.01); *H04L 12/1859* (2013.01);
(Continued)

(58) Field of Classification Search
CPC .. H04L 51/20; H04L 12/1845; H04L 12/1859
(Continued)

(56) References Cited

U.S. PATENT DOCUMENTS

2007/0004424 A1*  1/2007  Sheen ...................... H04W 4/02
                                                          455/456.1
2008/0014971 A1*  1/2008  Morin ...................... H04W 4/18
                                                          455/466
(Continued)

FOREIGN PATENT DOCUMENTS

CN          101207845 A         6/2008
CN          101953197 A         1/2011

*Primary Examiner* — Nicholas Taylor
*Assistant Examiner* — Chong G Kim
(74) *Attorney, Agent, or Firm* — Muncy, Geissler, Olds & Lowe, P.C.

(57) ABSTRACT

A method for implementing end-to-end message push using a geographical signal feature cluster where a message provider uses an apparatus to establish message data related to a landmark, and according to the message data, a message push server acquires geographical signal feature clusters from a signal feature database and establishes a message push list. The message push server establishes a connection actively from a record in the message push list to notify a message receiver of retrieving a push condition; the message receiver uses an apparatus to detect a signal feature and provides the signal feature for the message push server to establish the push condition. Then the message receiver uses an apparatus to detect a signal feature, if the detected signal feature is the same as the signal feature in the geographical signal feature cluster in the push condition, a message will be pushed to the message receiver.

18 Claims, 7 Drawing Sheets

(51) Int. Cl.
*H04L 29/08* (2006.01)
*H04L 29/12* (2006.01)
*H04W 4/02* (2009.01)

(52) U.S. Cl.
CPC ............ *H04L 67/26* (2013.01); *H04L 61/609* (2013.01); *H04L 61/6022* (2013.01); *H04W 4/021* (2013.01)

(58) Field of Classification Search
USPC ........................................................ 709/202
See application file for complete search history.

(56) References Cited

U.S. PATENT DOCUMENTS

| | | | |
|---|---|---|---|
| 2008/0176583 A1* | 7/2008 | Brachet | G01S 5/0236 455/456.3 |
| 2009/0002237 A1* | 1/2009 | Nonoyama | G01S 5/02 342/450 |
| 2011/0219226 A1* | 9/2011 | Olsson | G06F 21/6245 713/150 |

* cited by examiner

METHOD FOR IMPLEMENTING END-TO-END MESSAGE PUSH USING A GEOGRAPHICAL SIGNAL FEATURE CLUSTER

BACKGROUND OF THE INVENTION

Field of Invention

The present invention relates to the technology of active push, and more particularly to a method for implementing message push according to a signal feature cluster of a cellular or Wireless Fidelity (WiFi) wireless network within the range of a location coordinate of a landmark.

Related Art

With the rapid growth of the number of mobile Internet users, a variety of location information-based value-added application services are also developing fast. Currently conventional technologies still are mostly used for acquisition of a service message. A mode of PULL synchronous interaction is mainly used, and the method is: In a case that a mobile user has a service demand, a mobile client actively requires to establish a connection to a server end to pull a service message. For some value-added application services that have real-time requirements, such a mode is very likely to influence the value and practicability of a service message directly due to factors such as time and location. To enable a mobile user to acquire a latest service message in real time and at any location, a technology of a mode of PUSH asynchronous interaction is developed, in which a proper service message is actively pushed to a mobile user at a suitable time and a suitable location, and there are already attention to and focus on relevant service fields of location information-based value-added applications.

In a cellular wireless network environment, in a current stage of active push of a service message is mostly achieved by using a short message service (SMS), and the method may generally include: a data mining SMS and a region SMS. In the data mining SMS, conditions such as gender, age, and district are set and then a short message is sent at a designated time. In the region SMS, a switch of a designated area is used for detection to send a short message upon entry into the area at a designated time. In terms of technology, an SMS method has advantages of being simple and easy to execute while mainly has a disadvantage of requiring database support of a telecommunication operator, which eventually results in complicated and long-term message push plans and programs. Although the method can meet real time demands for receiving a service message of a mobile user, but lacks accurate control in providing for demands for precision and location suitability for receiving a service message. Another active push technology provides message push by using the Wireless Application Protocol (WAP) Push Protocol formulated by the WAP Forum. The structure of WAP Push mainly includes three parts: a push initiator (PI), a push proxy gateway (PPG), and a WAP client. A content form of message push includes a service notification and service loading, in which a work method of service notification form is briefly descried in the following: The PI is a message provider and raises a requirement of pushing a message notification to the PPG by using the Push Access Protocol; the PPG converts a notification of a service into a binary form and then transfers the notification of the service to a mobile client by using the Over-the-Air (OTA) Protocol. After receiving the notification, the mobile client may select whether to establish a connection immediately or later. If selecting to establish a connection immediately, the mobile client is connected to a uniform resource locator (URL) address providing a service in a common PULL manner through the PPG to acquire message content, and then transfers the message content to the mobile client in an eXtensible Markup Language (XML) form to display a latest message. If selecting to establish a connection later, the notification of the service is first saved in the mobile client for a period of time; once a time limit is exceeded, the notification of the service is automatically cleared. The WAP Push Protocol may send a notification message as a response to a mobile user according to a different requirement raised by each mobile user and within a specific time, so as to achieve active notification of real-time information. However, in meeting the demands for precision and location suitability for a mobile user to receive a service message, there are still issues to overcome and technical bottlenecks to remove.

As for active push technologies, in addition to the methods above, active push base on a Bluetooth signal is also a method in use, which has a desirable geographical condition setting for receiving a service message but mainly has a disadvantage that Bluetooth on an apparatus needs to be turned on and the apparatus needs to be set to be detectable, and also, additional hardware cost and narrow definition of geographical conditions are also major problems.

SUMMARY OF THE INVENTION

The method for active push of a message proposed in the present invention is applicable to cellular and WiFi wireless networks. A first apparatus may be regarded as a message provider, set a landmark with a user interface (UI) at an apparatus end, and establish message data related to the landmark; next, according to the message data, a message push server acquires a plurality of geographical signal feature clusters from a signal feature database, and establishes a message push list based on the acquired plurality of geographical signal feature clusters and the message data.

The method for active push of a message the present invention performs active push of a message by means of a signal feature data detected by a second apparatus. The second apparatus may be regarded as a message receiver, and the procedures of active push of a message may include message notification and message push. The procedure of message notification includes the following steps: according to the message push list, the message push server actively establishes a notification connection and notifies the second apparatus of retrieving a push condition; after the second apparatus is notified of retrieving the push condition, the second apparatus detects a signal feature data of a serving cell base station or serving access point (AP) and provides the signal feature data to the message push server to select a geographical signal feature cluster from a plurality of geographical signal feature clusters in the message push list to establish the push condition, and returns the push condition to the second apparatus. The procedure of message push includes the following steps: after the push condition is received, the second apparatus detects a signal feature data of the serving cell base station or serving AP, and if the detected signal feature data is the same as a signal feature in the geographical signal feature cluster in the push condition, the second apparatus provides the detected signal feature to a location operation server to compute a location of the second apparatus; and if the computed location is located inside the range of a location coordinate of the landmark, the message push server actively pushes a message to the second apparatus.

The foregoing method of the present invention is a pure software structure and can be arranged in a physical machine through program code. When the machine loads and executes the program code, the machine becomes an apparatus for implementing the present invention.

The present invention has the advantages as follows: A mobile user can acquire a latest service message in real time and at any location, and a proper service message is actively pushed to the mobile user at a suitable time and a suitable location, so as to improve the value and practicability of the service message. Also, the active push is a pure software service in implementation and no additional physical device cost is required for a mobile user, and a reception region has a large area. Moreover, a pusher may control push content and a time point, so as to bypass restrictions of a telecommunication operator in terms of operations, making business modes of push more flexible; also, the push content is not limited to text, but can also be an image or multimedia for presentation.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The present invention is further described below with reference to the accompanying drawings and specific embodiments, so that persons skilled in the art can better understand the present invention and implement the present invention there accordingly, but the embodiments mentioned shall not be construed as a limitation on the present invention.

Figure 1:
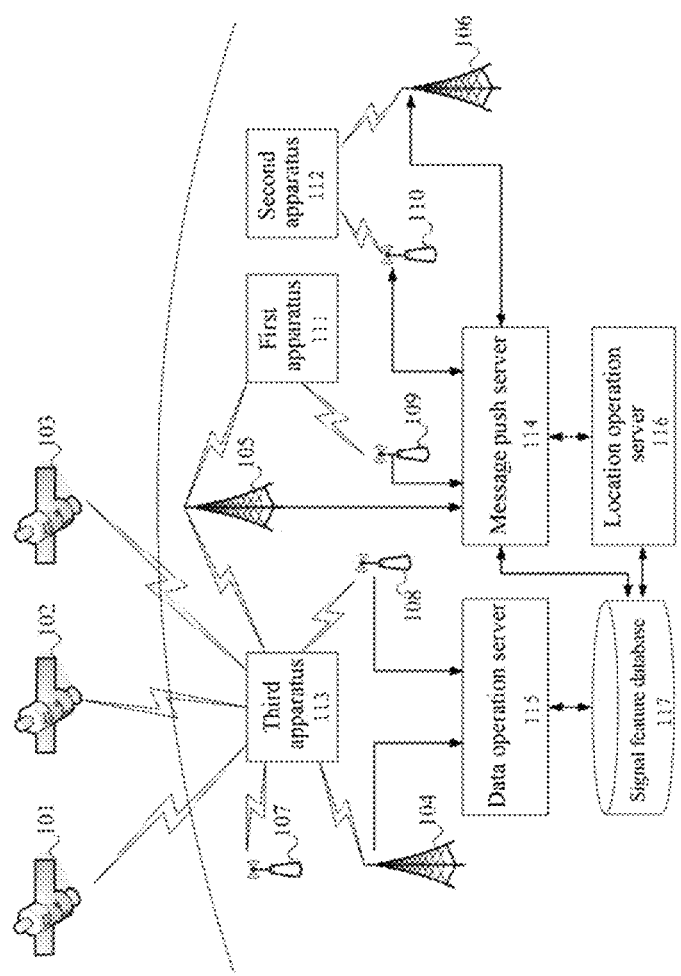
FIG. 1 is a schematic view of a message push network according to an embodiment of the present invention.

FIG. 1 is a schematic view of a message push network according to an embodiment of the present invention. The message push network includes a plurality of Global Positioning Satellite (GPS) satellites 101, 102, and 103, a plurality of cellular cell base stations 104, 105, and 106, a plurality of WiFi APs 107, 108, 109, and 110, a first apparatus 111, a second apparatus 112, a third apparatus 113, a message push server 114, a data operation server 115, a location operation server 116, and a signal feature database 117. The plurality of GPS satellites transfer a location signal to the ground surface around the clock. Each cell base station in the plurality of cell base stations has a common control channel (CCH), which can continuously broadcast a signal in a cellular network to provide a unique CGI code. Each WiFi AP in the plurality of WiFi APs has a CCH, which can continuously broadcast a signal in a WiFi network to provide a unique MAC address. It should be noted that the numbers of the GPS satellites, cell base stations, and WiFi APs are not limited to the numbers shown in FIG. 1, and the numbers may be changed in different embodiments without departing from the spirit of the present invention.

The message push server 114, the data operation server 115, the location operation server 116, and the signal feature database 117 are erected on a cloud end, and transfer and receive data with the first apparatus 111, the second apparatus 112, and the third apparatus 113 through a cellular or WiFi wireless network. The first apparatus 111 is a message provider, whereas the second apparatus 112 is a message receiver. The first apparatus 111 and the second apparatus 112 may include, but are not limited to, a smart mobile phone, a personal digital assistant (PDA), a tablet computer or a notebook computer. The third apparatus 113 may be a signal feature data provider, which may include, but is not limited to, a smart mobile phone and a PDA. It should be noted that the first apparatus 111 and the second apparatus 112 may be regarded as clients independent from each other, and may also be regarded as a same client in different embodiments without departing from the spirit of the present invention. The third apparatus 113 is used for collecting signal feature data and providing the signal feature data for the signal feature database 117 to perform data update, of which the implementation manner is: acquiring the signal feature data, including a GPS location coordinate, CGI code parameters and signal intensity values of the plurality of cell base stations, and MAC address parameters and signal intensity values of the plurality of WiFi APs, from the plurality of GPS satellites, the plurality of cell base stations, and the plurality of WiFi APs by using an application program at an apparatus end. The work principle of the acquisition of a GPS location coordinate is approximately as follows: detecting that at least 4 GPS satellite signals exist, measuring time of arrival (ToA) values according to the signals from the satellites to compute a location coordinate. Next, by means of the connection of the cellular or WiFi wireless network (for example, 104 or 108 shown in FIG. 1), the third apparatus 113 transfers the plurality of pieces of signal feature data to the data operation server 115 through an application programming interface (API). After the plurality of pieces of signal feature data is received, a reception confirmation signal is returned to the third apparatus 113, and at the same time, the data operation server 115 searches the signal feature database 117 to acquire signal feature data of the corresponding database, and executes data fusion and location estimation, where the location refers to the location of a cell base station and a WiFi AP. According to the fusion data of the data operation server 115, the signal feature database 117 updates or stores data, and records a location information state.

Figure 2:
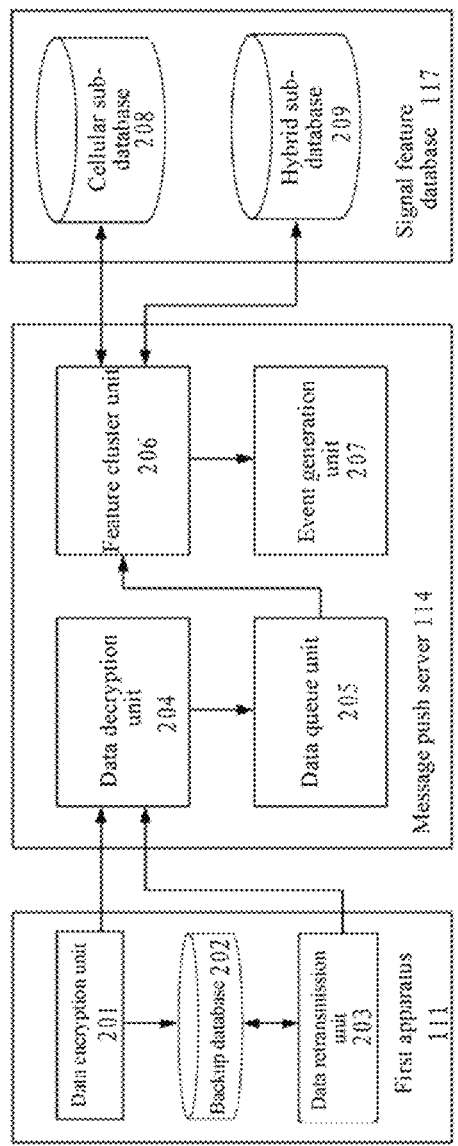
FIG. 2 is a schematic structural view of a message push establishment mechanism according to an embodiment of the present invention.
Figure 3:
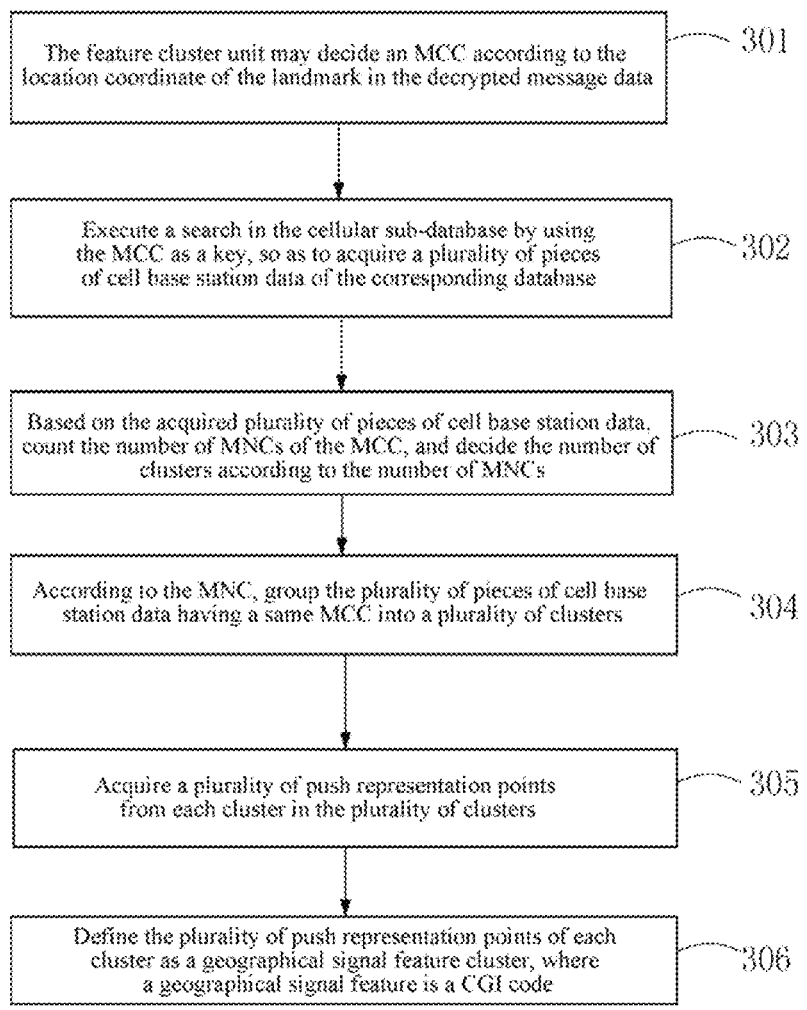
FIG. 3 is a schematic flow chart of acquiring a geographical signal feature cluster from a cellular sub-database according to the embodiment of the present invention.
Figure 4:
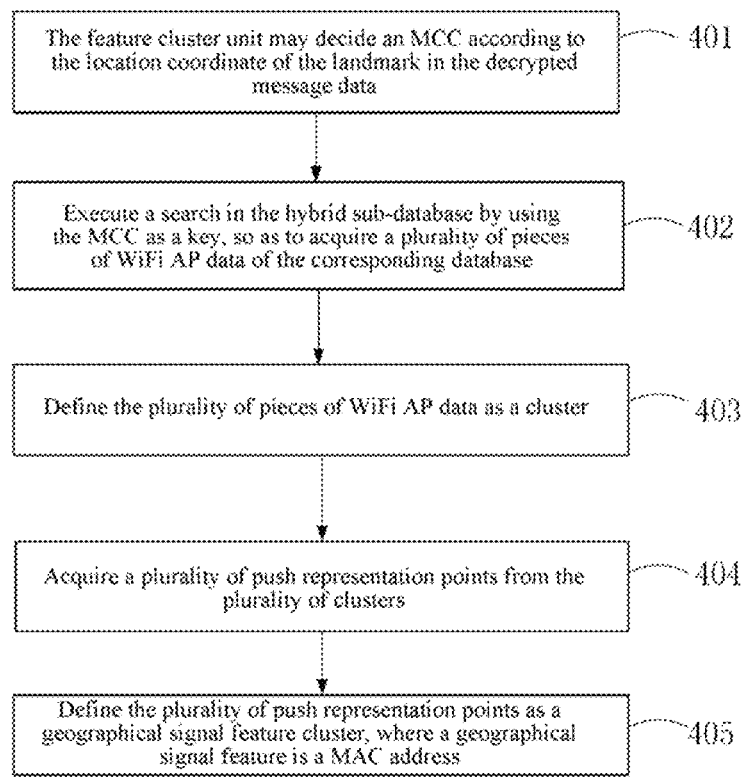
FIG. 4 is a schematic flow chart of acquiring a geographical signal feature cluster from a hybrid sub-database according to the embodiment of the present invention.

As shown in FIG. 2, FIG. 3, and FIG. 4, how to establish message push is mainly described according to an embodiment of the present invention. As shown in FIG. 2, FIG. 2 is a schematic structural view of an establishment mechanism. The first apparatus 111 uses a UI at an apparatus end to set a landmark, and establishes push message data related to the landmark, where a landmark may be regarded as an independent event. A location coordinate of a landmark may be acquired from a third-party service provider such as Google. The message data may include, but is not limited to, at least one message receiver, the location coordinate of the landmark, a push distance, a push start and end date and time, and message content. The message content may include, but is not limited to, text, a card, an image, a sound, and a video. Next, a data encryption unit 201 is responsible for executing compression and encryption on the message data, and transferring the encrypted message data to a backup database 202 for storage. By means of a connection of a cellular or WiFi wireless network (for example, 105 or 109 in FIG. 1), the first apparatus 111 transfers the encrypted message data to the message push server 114 through an API. Because of transmission characteristics of a wireless network, if the encrypted message data fails to be transferred, a data retransmission unit 203 is started and acquires the encrypted message data from the backup database 202 to perform a retransmission action.

The message push server 114 is equipped with a data decryption unit 204, a data queue unit 205, a feature cluster unit 206, and an event generation unit 207. After receiving the encrypted message data, the message push server 114 returns a reception confirmation signal to the first apparatus 111, and at the same time, the decryption unit 204 is responsible for executing decompression and decryption on the message data. Usually, the message push server 114 may process a plurality of push events at the same time, and the data queue unit 205 is used for endowing an event with a priority value according to the push start and end date and time in the decrypted message data, and arrange the plurality of pieces of decrypted message data in a descending order of priority values. According to the decrypted message data, the feature cluster unit 206 can acquire a plurality of geographical signal feature clusters from the signal feature database 117. The signal feature database 117 includes a cellular sub-database 208 and a hybrid sub-database 209. The cellular sub-database 208 stores a plurality of pieces of cell base station data, and each piece of cell base station data records a unique CGI code parameter and location information. The hybrid sub-database 209 stores a plurality of pieces of WiFi AP data, and each piece of WiFi AP data records at least one CGI code parameter, a unique MAC address parameter, and location information, where the CGI code parameter includes a mobile country code (MCC), a mobile network code (MNC), a location area code (LAC), and a cell identity (CID).

As shown in FIG. 3, FIG. 3 is a schematic flow chart of acquiring a geographical signal feature cluster from a cellular sub-database. The feature cluster unit 206 may decide an MCC according to the location coordinate of the landmark in the decrypted message data (Step 301), and execute a search in the cellular sub-database 208 by using the MCC as a key, so as to acquire a plurality of pieces of cell base station data of the corresponding database (Step 302).

Subsequently, execute Step 303: Based on the acquired plurality of pieces of cell base station data, count the number of MNCs of the MCC, and decide the number of clusters according to the number of MNCs.

Subsequently, execute Step 304: According to the MNC, group the plurality of pieces of cell base station data having a same MCC into a plurality of clusters. The manner of grouping clusters is: For the plurality of pieces of cell base station data, cell base station data having a same MNC is grouped into a same cluster. In this embodiment, the plurality of pieces of cell base station data of each cluster may be defined into a n-point data group, which is represented by a set $C_k$ as $C_k=\{c_1, \ldots, c_n\}$, where k is the number of the clusters.

Subsequently, execute Step 305: Acquire a plurality of push representation points from each cluster in the plurality of clusters. The implementation manner of Step 305 is: The cluster $C_k$ includes n data points, and each data point has a location coordinate and a unique CGI code; a distance value between each data point and the location coordinate of the landmark in the decrypted message data is computed; if the distance value is smaller than the push distance, the data point is used as a push representation point, and the CGI code of the data point is stored.

Subsequently, execute Step 306: Define the plurality of push representation points of each cluster as an i-point data group, which is represented by a set $P_k$ as $P_k=\{p_1, \ldots, p_i\}$, where i smaller than n and k is the number of the clusters. The set $P_k$ is a geographical signal feature cluster of message push according to an embodiment of the present invention, and a geographical signal feature is a CGI code.

As shown in FIG. 4, FIG. 4 is a schematic flow chart of acquiring a geographical signal feature cluster from a hybrid sub-database. The feature cluster unit 206 may decide an MCC according to the location coordinate of the landmark in the decrypted message data (Step 401), and execute a search in the hybrid sub-database 209 by using the MCC as a key, so as to acquire a plurality of pieces of WiFi AP data of the corresponding database (Step 402).

Subsequently, execute Step 403: Define the plurality of pieces of WiFi AP data as an m-point cluster, which is represented by a set W as $W=\{w_1, \ldots, w_m\}$.

In Step 404, acquire a plurality of push representation points from the cluster. The implementation manner of Step 404 is: Each data point in the cluster has a location coordinate and a unique MAC address; a distance value between each data point and the location coordinate of the landmark in the decrypted message data is computed; if the distance value is smaller than the push distance, the data point is used as a push representation point, and the MAC address of the data point is stored.

Subsequently, execute Step 405: Define the plurality of push representation points as a j-point data group, which is represented by a set Q as $Q=\{q_1, \ldots, q_j\}$, where j is smaller than m. The set Q is a geographical signal feature cluster of message push according to an embodiment of the present invention, and a geographical signal feature is a MAC address.

It should be noted that, in an embodiment of the present invention, the feature cluster unit 206 may acquire (k+1) geographical signal feature clusters from a unicase landmark. Without departing from the spirit of the present invention, in a different embodiment, a plurality of landmarks is allowed to exist at the same time according to an attribute of landmark data content provided by the first apparatus 111, that is, multicase landmarks. In this case, the feature cluster unit 206 may acquire L×(k+1) geographical signal feature clusters from the multicase landmark, where L is the number of landmarks.

The feature cluster unit 206 transfers the acquired plurality of geographical signal feature clusters to the event generation unit 207, and the event generation unit 207 specifies a message push identity (ID), and establishes a message push list, where the message push list records the message push ID, a message receiver in the decrypted message data, a push start and end date and time, message content, and the received plurality of geographical signal feature clusters (that is, the sets $P_k$ and Q).

Figure 5:
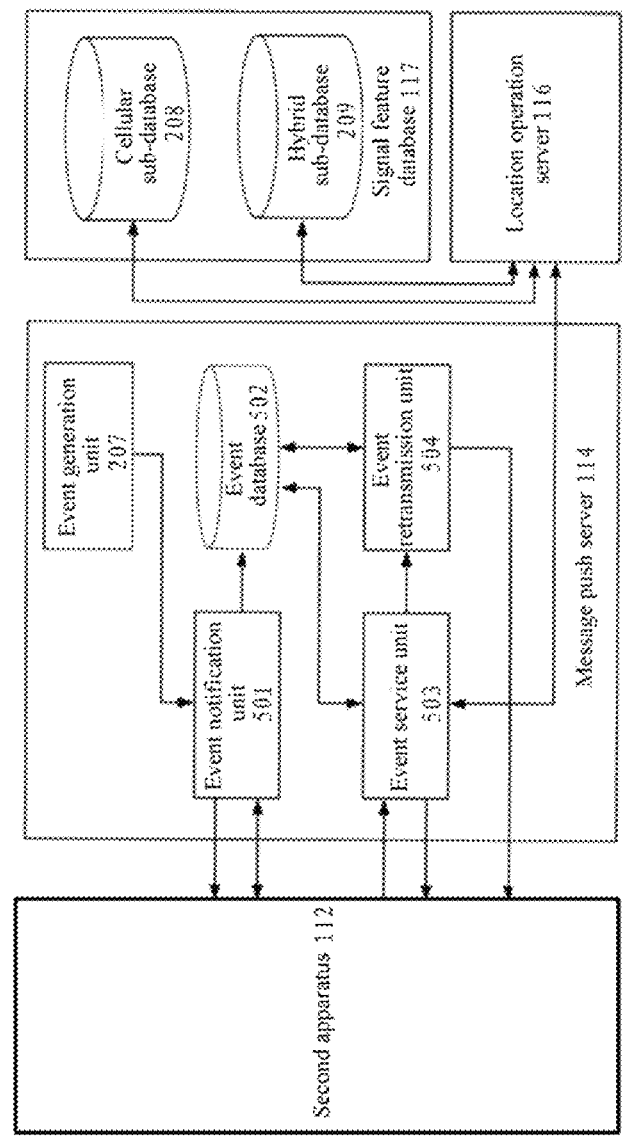
FIG. 5 is a schematic structural view of an execution mechanism of message push according to an embodiment of the present invention.
Figure 6:
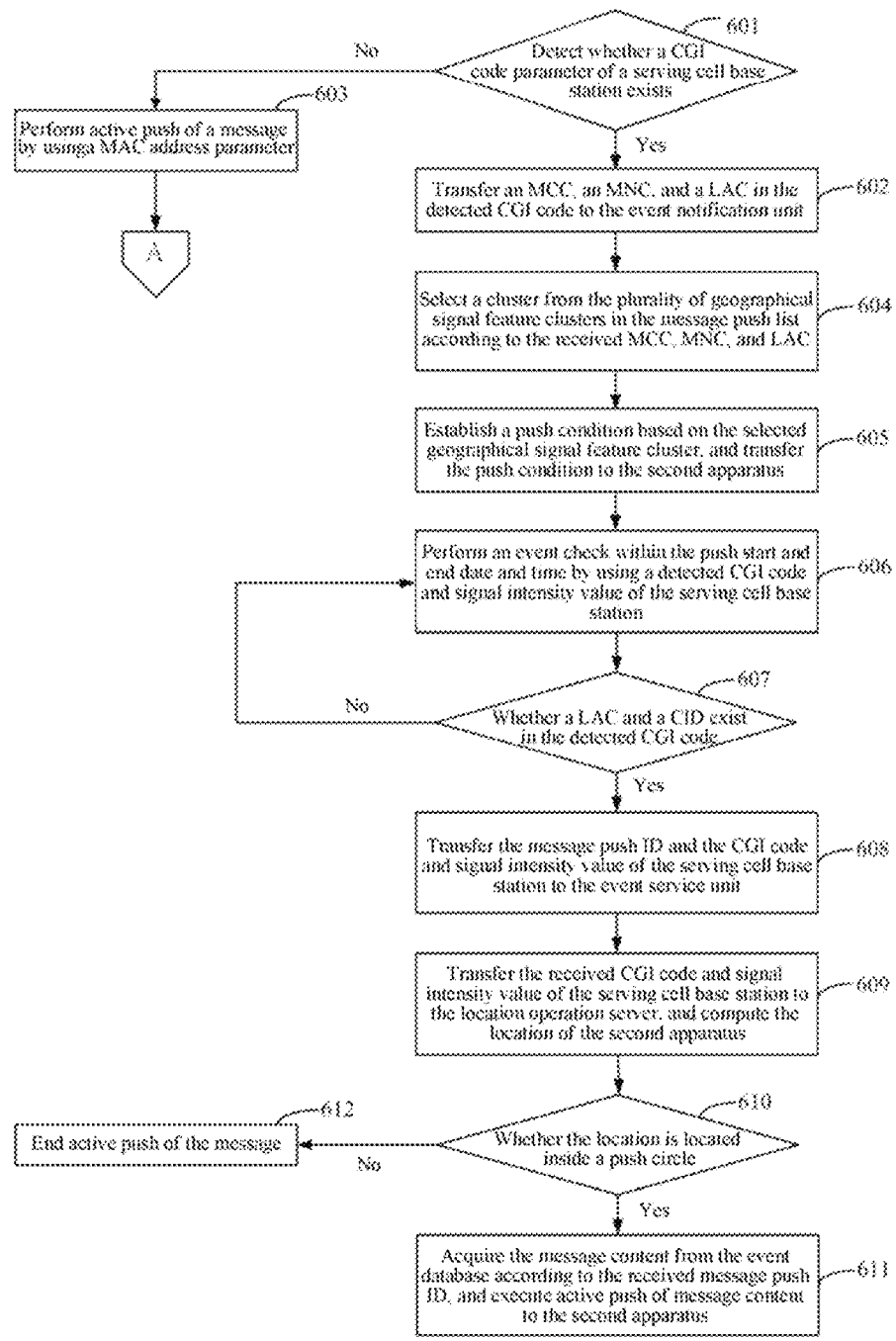
FIG. 6 is a schematic flow chart of active push of a message according to a detected cell global identity (CGI) code parameter according to the embodiment of the present invention.
Figure 7:
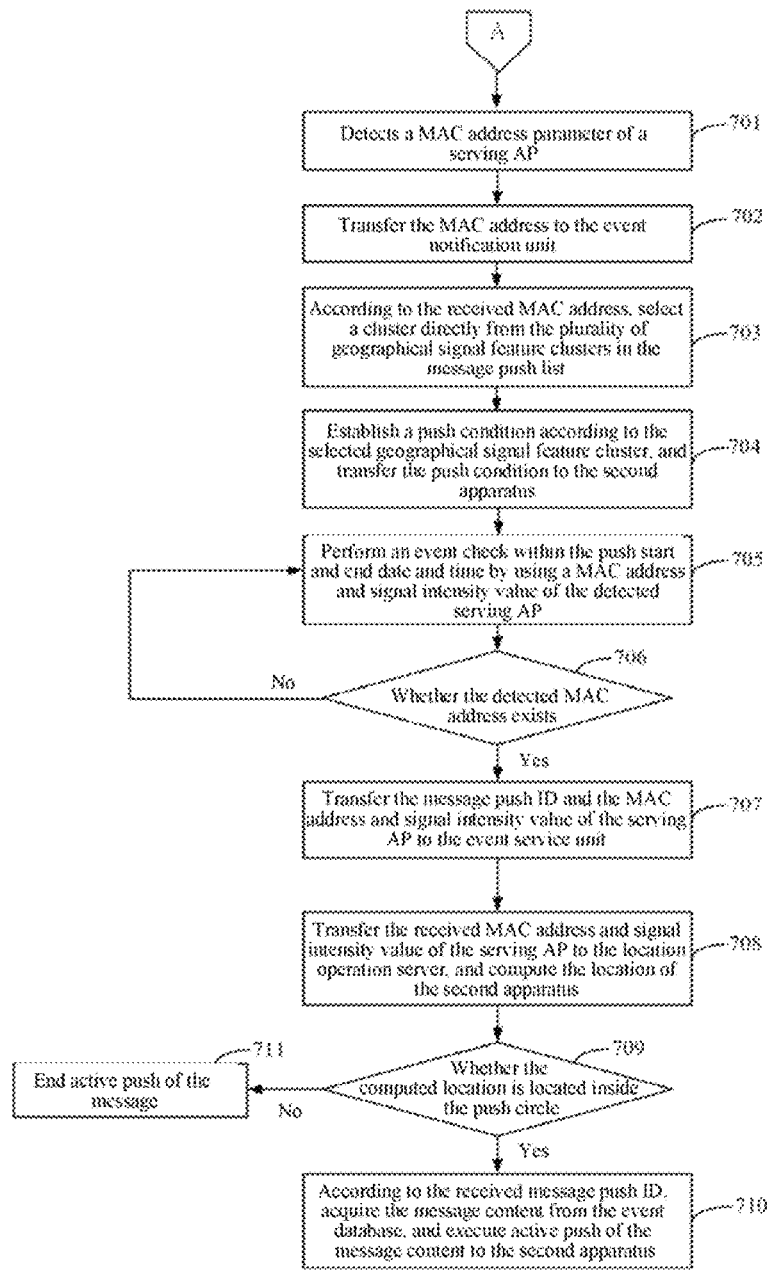
FIG. 7 is a schematic flow chart of active push of a message according to a detected Media Access Control (MAC) address parameter according to the embodiment of the present invention.

As shown in FIG. 5 to FIG. 7, the method of executing message push is mainly described according to an embodiment of the present invention. As shown in FIG. 5, FIG. 5 is a schematic structural view of an execution mechanism. The message push server 114 is further equipped with an event notification unit 501, an event database 502, an event service unit 503, and an event retransmission unit 504. The event generation unit 207 establishes a message push list and then transfers the message push list to the event notification unit 501. According to a record in the message push list, the event notification unit 501 is responsible for actively establishing a notification connection and notifying the second apparatus 112 (that is, a message receiver) of retrieving a push condition, and at the same time transfers a message push ID and message content in the message push list to the event database 502 for storage. After receiving the notification, the second apparatus 112 detects a signal feature data, and establishes a connection to the event notification unit 501 to acquire the push condition, and the detected signal feature includes a CGI code parameter or a MAC address parameter. It should be noted that, in an embodiment of the present invention, the event notification unit 501 may provide a different push condition based on the signal feature detected by the second apparatus 112. Based on the acquired push condition, the second apparatus 112 performs an event check at an apparatus end if the push condition exists, the second apparatus 112 establishes a connection and the event service unit 503 executes message content push.

As shown in FIG. 6, FIG. 6 is a schematic flow chart of active push of a message according to a detected CGI code parameter. The procedure of active push of a message may include message notification and message push. The procedure of message notification includes the following steps: After receiving the notification, if the second apparatus 112 detects that a CGI code parameter of a serving cell base station (for example, 106 in FIG. 1) exists (Step 601), an MCC, an MNC, and a LAC in the detected CGI code are transferred to the event notification unit 501 through an API (Step 602), and if it is detected that a CGI code parameter of a serving cell base station does not exist, it represents that the second apparatus 112 performs active push of a message by using a MAC address parameter (Step 603).

Subsequently, execute Step 604: According to the received MCC, MNC, and LAC, select a cluster from the plurality of geographical signal feature clusters (that is, the set $P_k$) in the message push list. The implementation manner of Step 604 is: The event notification unit 501 compares the received MCC, MNC, and LAC and an MCC, an MNC, and a LAC in each cluster in the plurality of geographical signal feature clusters; if the MCC, the MNC, and the LAC exist, it is selected to compare the same cluster; if the MCC, the MNC, and the LAC do not exist, comparison is further performed according to the MCC and the MNC, and it is selected to compare the same cluster.

Subsequently, execute Step 605: Establish a push condition based on the selected geographical signal feature cluster, and transfer the push condition to the second apparatus 112. The push condition includes at least one LAC and at least one CID in the selected geographical signal feature cluster and the message push ID and a push start and end date and time in the message push list.

The procedure of message push includes the following steps:

Subsequently, execute Step 606: Perform an event check within the push start and end date and time by using a detected CGI code and signal intensity value of the serving cell base station. The implementation manner of Step 606 is: If a LAC and a CID in the CGI code detected by the second apparatus 112 are the same as a LAC and a CID in the geographical signal feature cluster in the push condition (Step 607), the message push ID and the CGI code and signal intensity value of the serving cell base station are transferred to the event service unit 503 (Step 608), and otherwise, Step 606 continues to be executed.

Subsequently, execute Step 609: The event service unit 503 transfers the received CGI code and signal intensity value of the serving cell base station to the location operation server 116, and computes the location of the second apparatus 112; if it is computed that the location is located inside a push circle (Step 610), the procedure turns to Step 611, and otherwise, end the active push of the message (Step 612). In an embodiment of the present invention, the push circle refers to a circle defined with the location coordinate of the landmark as the center of the circle and a push distance as the radius.

In Step 611, the event service unit 503 may acquire the message content from the event database 502 according to the received message push ID, and execute active push of message content to the second apparatus 112.

As shown in FIG. 7, FIG. 7 is a schematic flow chart of active push of a message according to a detected MAC address parameter. The procedure of active push of a message may include message notification and message push. The procedure of message notification includes the following steps: The second apparatus 112 detects a MAC address parameter of a serving AP (for example, 110 in FIG. 1) (Step 701), and transfers the MAC address to the event notification unit 501 through an API (Step 702).

Subsequently, execute Step 703: According to the received MAC address, the event notification unit 501 may select a cluster directly from the plurality of geographical signal feature clusters (that is, the set Q) in a message push list.

Subsequently, execute Step 704: Establish a push condition based on the selected geographical signal feature cluster, and transfer the push condition to the second apparatus 112. The push condition includes a MAC address parameter in the selected geographical signal feature cluster and a message push ID and a push start and end date and time in the message push list.

The procedure of message push includes the following steps:

In Step 705, perform an event check within the push start and end date and time by using a MAC address and signal intensity value of the detected serving AP. The implementation manner of Step 705 is: If the MAC address detected by the second apparatus 112 is the same as the MAC address in the geographical signal feature cluster in the push condition (Step 706), the message push ID and the MAC address and signal intensity value of the serving AP are transferred to the event service unit 503 (Step 707), and otherwise, Step 705 continues to be executed.

Subsequently, execute Step 708: The event service unit 503 transfers the received MAC address and signal intensity value of the serving AP to the location operation server 116, and computes the location of the second apparatus 112; if the computed location is located inside the push circle (Step 709), the procedure turns to Step 710, and otherwise, end active push of the message (Step 711).

In Step 710, according to the received message push ID, the event service unit 503 may acquire the message content from the event database 502, and execute active push of the message content to the second apparatus 112.

It should be noted that, in an embodiment of the present invention, after the second apparatus 112, for example, a smart mobile phone or a tablet computer, receives a notification of the push condition, the second apparatus 112 may detect a CGI code parameter of a serving cell base station and a MAC address parameter of a serving AP at the same time; in this case, for the method of executing active push of a message, the steps are as discussed above (Steps 602 to 612).

When the event service unit 503 executes push of message content to the second apparatus 112, due to transmission characteristics of a wireless network, the push event may fail; in this case, the event service unit 503 transfers the received message push ID to the event retransmission unit 504. After receiving the message push ID, the event retransmission unit 504 may acquire the message content from the event database 503, and is responsible for performing an action of pushing the message content again.

The foregoing method, or specific system units, or some system units of the present invention are pure software structures, which may be arranged in a physical medium such as a hard disk, optical disc or any electronic apparatus (for example, a smart mobile phone, a computer readable storage medium) through program code. When a machine loads and executes the program code (for example, a smart mobile phone loads and executes the program code), the machine becomes an apparatus for implementing the present invention. The foregoing method and apparatus of the present invention may also be transferred in the form of program code through some transfer media such as a cable, optical fiber or any transmission form. When the program code is received by a machine (for example, a smart mobile phone) and is loaded and executed by the machine, the machine becomes an apparatus for implementing the present invention.

The foregoing embodiments are only preferred embodiments provided for thorough description of the present invention rather than to limit the protection scope of the present invention. Equivalent replacements or variations made by persons skilled in the art on the basis of the present invention shall fall within the protection scope of the present invention as defined by the claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for implementing end-to-end message push using a geographical signal feature cluster, applicable to cellular and Wireless Fidelity (WiFi) wireless networks, and comprising the following steps:

setting, by a first apparatus regarded as a message provider, a landmark with an apparatus end, and establishing message data related to the landmark;

acquiring, by a message push server according to the message data, a plurality of geographical signal feature clusters from a signal feature database, and establishing a message push list based on the acquired plurality of geographical signal feature clusters and the message data;

establishing actively, by the message push server according to the message push list, a connection to notify a second apparatus of retrieving a push condition, wherein the second apparatus is regarded as a message receiver;

detecting, after the second apparatus is notified of retrieving the push condition, by the second apparatus, a signal feature data of a serving cell base station or a serving access point (AP), and providing the signal feature for the message push server to select a geographical signal feature cluster from the plurality of geographical signal feature clusters in the message push list to establish the push condition, and transferring the push condition to the second apparatus;

after the push condition is received, detecting, by the second apparatus, a signal feature data of the serving cell base station or the serving AP;

if the detected signal feature data is the same as a signal feature in the geographical signal feature cluster in the push condition, providing, by the second apparatus, the detected signal feature data to a location operation server to compute a location of the second apparatus; and if the computed location is located inside the range of a location coordinate of the landmark, pushing actively, by the message push server, a message to the second apparatus.

2. The method for implementing end-to-end message push using a geographical signal feature cluster according to claim 1, wherein the first apparatus is a smart mobile phone, a personal digital assistant (PDA), a tablet computer or a notebook computer.

3. The method for implementing end-to-end message push using a geographical signal feature cluster according to claim 1, wherein the message data comprises at least one message receiver, the location coordinate of the landmark, a push distance, a push start and end date and time, and message content.

4. The method for implementing end-to-end message push using a geographical signal feature cluster according to claim 3, wherein the message content further comprises text, a card, an image, a sound, and a video.

5. The method for implementing end-to-end message push using a geographical signal feature cluster according to claim 1, wherein the signal feature database comprises a cellular sub-database and a hybrid sub-database, the cellular sub-database stores a plurality of pieces of cell base station data, each piece of cell base station data records a unique cell global identity (CGI) code parameter and location information, the hybrid sub-database stores a plurality of pieces of WiFi AP data, and each piece of WiFi AP data records at least one CGI code parameter, a unique Media Access Control (MAC) address, and location information.

6. The method for implementing end-to-end message push using a geographical signal feature cluster according to claim 1, wherein acquiring, by the message push server, a geographical signal feature cluster from a cellular sub-database comprises the following steps:

deciding a mobile country code (MCC) according to the location coordinate of the landmark in the message data;

executing a search in the cellular sub-database by using the MCC as a key, so as to acquire a plurality of pieces of cell base station data corresponding to the database;

counting the number of mobile network codes (MNCs) of the MCC based on the acquired plurality of pieces of cell base station data, and deciding the number of clusters according to the number of MNCs;

grouping the plurality of pieces of cell base station data having a same MCC into a plurality of clusters according to the MNC;

acquiring a plurality of push representation points from each cluster in the plurality of clusters; and defining the plurality of push representation points of each cluster as a geographical signal feature cluster, wherein a geographical signal feature is a cell global identity (CGI) code.

7. The method for implementing end-to-end message push using a geographical signal feature cluster according to claim 6, further comprising: computing a distance value for each data point of each cluster in the plurality of clusters according to the location coordinate of the landmark in the message data, and if the distance value is smaller than a push distance, using the data point as a push representation point, and storing a CGI code of the data point.

8. The method for implementing end-to-end message push using a geographical signal feature cluster according to claim 1, wherein acquiring, by the message push server, a geographical signal feature cluster from a hybrid sub-database comprises the following steps:

deciding a mobile country code (MCC) according to the location coordinate of the landmark in the message data;

executing a search in the hybrid sub-database by using the MCC as a key, so as to acquire a plurality of pieces of WiFi AP data corresponding to the database;

defining the plurality of pieces of WiFi AP data as a cluster;

acquiring a plurality of push representation points from the cluster; and defining the plurality of push representation points as a geographical signal feature cluster, wherein a geographical signal feature is a Media Access Control (MAC) address.

9. The method for implementing end-to-end message push using a geographical signal feature cluster according to claim 8, further comprising: computing a distance value for each data point in the cluster according to the location coordinate of the landmark in the message data, and if the distance value is smaller than the push distance, using the data point as a push representation point, and storing a MAC address of the data point.

10. The method for implementing end-to-end message push using a geographical signal feature cluster according to claim 1, wherein the message push list records a push identity (ID) of the message, a message receiver in the message data, a push start and end date and time, message content, and the received plurality of geographical signal feature clusters.

11. The method for implementing end-to-end message push using a geographical signal feature cluster according to claim 1, wherein the second apparatus is a smart mobile phone, a personal digital assistant (PDA), a tablet computer or a notebook computer.

12. The method for implementing end-to-end message push using a geographical signal feature cluster according to claim 11, wherein the signal feature detected by the second apparatus comprises a cell global identity (CGI) code parameter and signal intensity of a serving cell base station and a Media Access Control (MAC) address parameter and signal intensity of a serving access point (AP).

13. The method for implementing end-to-end message push using a geographical signal feature cluster according to claim 1, wherein establishing a push condition based on the CGI code parameter detected by the second apparatus comprises the following steps:

transferring a mobile country code (MCC), a mobile network code (MNC), and a location area code (LAC) in the detected CGI code to the message push server;

selecting, by the message push server according to the received MCC, MNC, and LAC, a cluster from the plurality of geographical signal feature clusters; and establishing, by the message push server according to the selected geographical signal feature cluster, a push condition, and transferring the push condition to the second apparatus.

14. The method for implementing end-to-end message push using a geographical signal feature cluster according to claim 13, wherein the push condition comprises at least one LAC and at least one cell identity (CID) in the selected geographical signal feature cluster and a message push identity (ID) and a push start and end date and time in the message push list.

15. The method for implementing end-to-end message push using a geographical signal feature cluster according to claim 1, wherein establishing the push condition based on a Media Access Control (MAC) address parameter detected by the second apparatus comprises the following steps:

transferring a MAC address to the message push server;

selecting directly, by the message push server according to the received MAC address, a cluster from the plurality of geographical signal feature cluster; and establishing, by the message push server according to the selected geographical signal feature cluster, a push condition, and transferring the push condition to the second apparatus.

16. The method for implementing end-to-end message push using a geographical signal feature cluster according to claim 15, wherein the push condition comprises a MAC address parameter in the selected geographical signal feature cluster, and a message push identity (ID) and a push start and end date and time in the message push list.

17. The method for implementing end-to-end message push using a geographical signal feature cluster according to claim 1, wherein executing active push by using a cell global identity (CGI) code parameter and signal intensity detected by the second apparatus comprises the following steps:

after the push condition is received, performing an event check within a push start and end date and time;

if a location area code (LAC) and a cell identity (CID) in a detected CGI code are the same as a LAC and a CID in the geographical signal feature cluster in the push condition, transferring a push identity (ID) of the message, the CGI code, and a signal intensity value to the message push server, and otherwise, continuing executing the step;

transferring the received CGI code and signal intensity value to the location operation server to compute the location of the second apparatus; and if the computed location is located inside a push circle, actively pushing, by the message push server, message content to the second apparatus, and otherwise, ending active push of the message.

18. The method for implementing end-to-end message push using a geographical signal feature cluster according to claim 1, wherein executing active push by using a Media Access Control (MAC) address parameter and signal intensity detected by the second apparatus comprises the following steps:

after the push condition is received, performing an event check within a push start and end date and time;

if a detected MAC address is the same as a MAC address in the geographical signal feature cluster in the push condition, transferring a push identity (ID) of the message, the MAC address, and a signal intensity value to the message push server, and otherwise, continuing executing the step;

transferring the received MAC address and signal intensity value to the location operation server to compute the location of the second apparatus; and if the computed location is located inside a push circle, actively pushing, by the message push server, message content to the second apparatus, and otherwise, ending active push of the message.

* * * * *